(12) United States Patent
Krone et al.

(10) Patent No.: US 7,051,639 B2
(45) Date of Patent: May 30, 2006

(54) MOUNTING APPARATUS AND METHOD FOR CYLINDER POSITION SENSOR

(75) Inventors: John J. Krone, Peoria, IL (US); Daniel L. Mikrut, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/180,873

(22) Filed: Jul. 13, 2005

(65) Prior Publication Data

US 2005/0274253 A1    Dec. 15, 2005

Related U.S. Application Data

(62) Division of application No. 10/742,566, filed on Dec. 19, 2003, now Pat. No. 6,941,827.

(51) Int. Cl.
   *F01B 25/26* (2006.01)
(52) U.S. Cl. .................. 91/1; 92/5 R; 324/207.24
(58) Field of Classification Search ............ 91/1; 92/5 R, 165 R, 165 PR; 324/207.13, 207.24
   See application file for complete search history.

(56) References Cited

U.S. PATENT DOCUMENTS 3,777,627 A * 12/1973 Goade ................ 92/171.1
4,839,591 A * 6/1989 Nomura et al. ............ 92/5 R
5,182,980 A * 2/1993 Greer ........................ 92/5 R
5,455,509 A * 10/1995 Semura et al. ............. 92/5 R
5,539,993 A * 7/1996 Kilpinen et al. ........... 33/706
6,253,460 B1 * 7/2001 Schmitz ................ 324/207.24
6,834,574 B1 * 12/2004 Neumann ................... 92/5 R

* cited by examiner

Primary Examiner—Thomas E. Lazo
(74) Attorney, Agent, or Firm—D. James Barnes

(57) ABSTRACT

A method and apparatus for detecting the position of a rod member of a cylinder assembly are provided. The cylinder assembly may have a cylinder body with a cylinder chamber therein, a gland member disposed within the cylinder chamber, and a rod member movably arranged within the cylinder chamber and a rod opening of the gland member. The method may include moving the gland member within the cylinder chamber to substantially align a gland aperture of the gland member with a cylinder aperture of the cylinder body; substantially fixing the gland member relative the cylinder body; positioning a position sensor within at least one of the cylinder aperture and the gland aperture; moving the rod member within the rod opening of the gland member and the cylinder chamber of the cylinder body; and operating the position sensor to detect the position of the rod member.

16 Claims, 2 Drawing Sheets

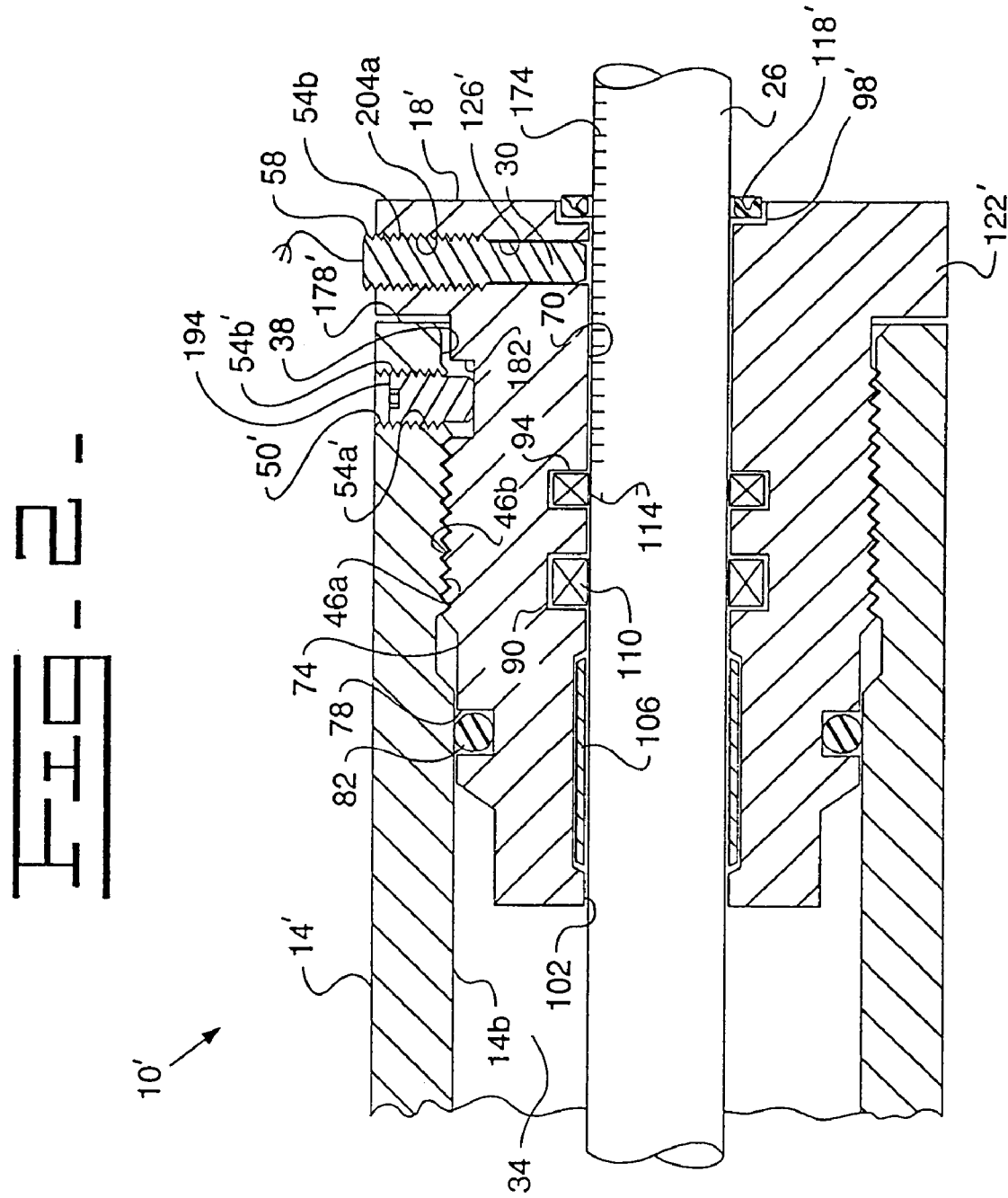

MOUNTING APPARATUS AND METHOD FOR CYLINDER POSITION SENSOR

This is a divisional of application Ser. No. 10/742,566, filed on Dec. 19, 2003.

TECHNICAL FIELD

The present invention relates generally to a mount for a position sensor and, more particularly, to a cylinder assembly with a position sensor mounted thereto.

BACKGROUND

Expansible chamber hydraulic cylinders having moveable piston-and-rod assemblies therein are widely used on industrial, earthmoving, and material handling machines and vehicles. It may be advantageous for such a machine or vehicle to include an automatic control system for automatically controlling the extension or retraction of a piston-and-rod assembly within a hydraulic cylinder so that partially or totally automatic work operations may be performed. In one type of automatic control system, a position sensor may be attached to a hydraulic cylinder to determine the position of the piston-and-rod assembly within the cylinder. One challenge with using such a position sensor is creating a robust, accurate, and affordable mount and mounting method for coupling the position sensor with the hydraulic cylinder.

International Patent Application No. PCT/FI93/00285, International Publication No. WO 95/01510, discloses a hydraulic cylinder with means for determining the position of a piston rod relative to a cylinder sleeve. The means consist of (i) optically readable marks provided on the surface of the piston rod and (ii) a reading device for reading the marks. The reading device is supported on the cylinder sleeve and is positioned in a mechanically protected structure, which constitutes part of a sealing/bearing end piece of the cylinder.

U.S. Pat. No. 5,455,509, issued to Semura et al., discloses a device for mounting a position-detecting sensor to a hydraulic cylinder. Semura discloses a piston rod with a magnetic scale formed on the outer surface thereof and a magnetic sensor mounted on a cylinder head proximate the magnetic scale for detecting the magnetic scale and determining the position of the piston rod. The sensor is mounted on a block, and the block is mounted on the head of the cylinder by a plurality of bolts.

Prior sensor mounting devices and methods may be improved by providing better arrangements and methods for mounting a sensor in proper alignment with detectable features formed on the rod of a cylinder assembly. For example, if (i) detectable features are disposed along the length of a rod member, (ii) the rod member is assembled in a predetermined rotational orientation within a cylinder body, and (iii) a sensor is mounted in a predetermined orientation on a head or gland member, the gland member must be assembled in a predetermined rotational orientation relative the cylinder body in order for the sensor to be properly rotationally aligned with the detectable features of the rod. However, when a threaded gland member is threaded into a threaded end of a cylinder body, the threaded gland member is typically threaded very tightly into the end of the cylinder body so that a frictional engagement is created between a flange portion of the gland member and the end of the cylinder body. The frictional engagement creates a frictional force sufficient to hold the gland member in position relative the cylinder body during operation of the cylinder assembly. The final rotational position of the gland member relative the cylinder body (and relative the detectable features of the rod) is often difficult to predict or predetermine since (i) the final position of the gland member relative the cylinder body will ultimately depend upon the arrangement of the threads of the gland member relative the flange portion thereof and relative the threads of the cylinder body, and (ii) it is often difficult and/or expensive to manufacture threaded glands and threaded cylinder bodies so that the threads thereof are consistently arranged and engaged exactly as desired.

Further, prior sensor mounting devices and methods may be improved by providing better arrangements and methods for maintaining the alignment of a sensor with detectable features on a cylinder assembly during operation of the cylinder assembly.

The present invention is directed at overcoming one or more problems or disadvantages associated with prior sensor-mounting devices and methods.

SUMMARY OF THE INVENTION

In one aspect of the present invention, a cylinder assembly is provided. The cylinder assembly may include a cylinder body having a longitudinally arranged cylinder chamber therein, and having a cylinder aperture in the cylinder body, the cylinder aperture intersecting the cylinder chamber. The cylinder assembly may further include a gland member having a rod opening therein, the gland member being disposed within the cylinder chamber of the cylinder body, the gland member having a gland aperture therein, the gland aperture intersecting the rod opening, and the gland aperture being arranged in substantial alignment with the cylinder aperture. The cylinder assembly may also include a rod member movably arranged within the cylinder chamber and the rod opening and a position sensor disposed within at least one of the cylinder aperture and the gland aperture.

In another aspect of the present invention, a cylinder assembly is provided. The cylinder assembly may include a cylinder body having a longitudinally arranged cylinder chamber therein, a first threaded area on the cylinder body, and a cylinder aperture in the cylinder body, the cylinder aperture intersecting the cylinder chamber. The cylinder assembly may further include a gland member having a rod opening therein, the gland member being disposed within the cylinder chamber of the cylinder body, the gland member having a second threaded area on the gland member, the second threaded area being threadedly engaged with the first threaded area of the cylinder body. The cylinder assembly may further include a rod member movably arranged within the cylinder chamber of the cylinder body and the rod opening of the gland member, the rod having one or more detectable features disposed along the length of the rod member; a position sensor attached to at least one of the cylinder body and the gland member and arranged in general alignment with a path of the one or more detectable features, the position sensor being operable to detect the one or more detectable features; and a stake member arranged within the cylinder aperture and engaging the gland member, the stake member being operable to substantially rotationally fix the gland member relative the cylinder body.

In a further aspect of the invention, a method for detecting the position of a rod member of a cylinder assembly may be provided. The cylinder assembly may have (i) a cylinder body with a longitudinally arranged cylinder chamber in the cylinder body and a cylinder aperture in the cylinder body, the cylinder aperture intersecting the cylinder chamber, (ii)

a gland member disposed within the cylinder chamber and including a rod opening in the gland member and a gland aperture in the gland member, the gland aperture intersecting the rod opening, and (iii) a rod member movably arranged within the cylinder chamber of the cylinder body and the rod opening of the gland member. The method may include moving the gland member within the cylinder chamber of the cylinder body to substantially align the gland aperture of the gland member with the cylinder aperture of the cylinder body; substantially fixing the gland member relative the cylinder body; positioning a position sensor within at least one of the cylinder aperture and the gland aperture; moving the rod member within the rod opening of the gland member and the cylinder chamber of the cylinder body; and operating the position sensor to detect the position of the rod member.

In another aspect of the invention, a method for detecting the position of a rod member of a cylinder assembly may be provided. The cylinder assembly may have (i) a cylinder body with a longitudinally arranged cylinder chamber in the cylinder body and a cylinder aperture in the cylinder body, the cylinder aperture intersecting the cylinder chamber, (ii) a gland member disposed within the cylinder chamber and including a rod opening in the gland member, and (iii) a rod member having one or more detectable features thereon, the rod member being movably arranged within the cylinder chamber of the cylinder body and the rod opening of the gland member. The method may include moving the gland member within the cylinder chamber of the cylinder body; positioning a position sensor in an opening of the gland member; substantially aligning the position sensor with a path of the one or more detectable features of the rod member; substantially fixing the gland member relative the cylinder body via a stake member that is (i) disposed within the cylinder aperture of the cylinder body and (ii) arranged in engagement with the gland member; moving the rod member within the rod opening of the gland member and the cylinder chamber of the cylinder body; and operating the position sensor to detect the position of the rod member as a function of the one or more detectable features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments or features of the invention and, together with the description, serve to explain the principles of the invention. In the drawings, FIG. 2 is a cross-sectional view of a cylinder assembly constructed and operable according to another embodiment of the present invention.

Figure 1:
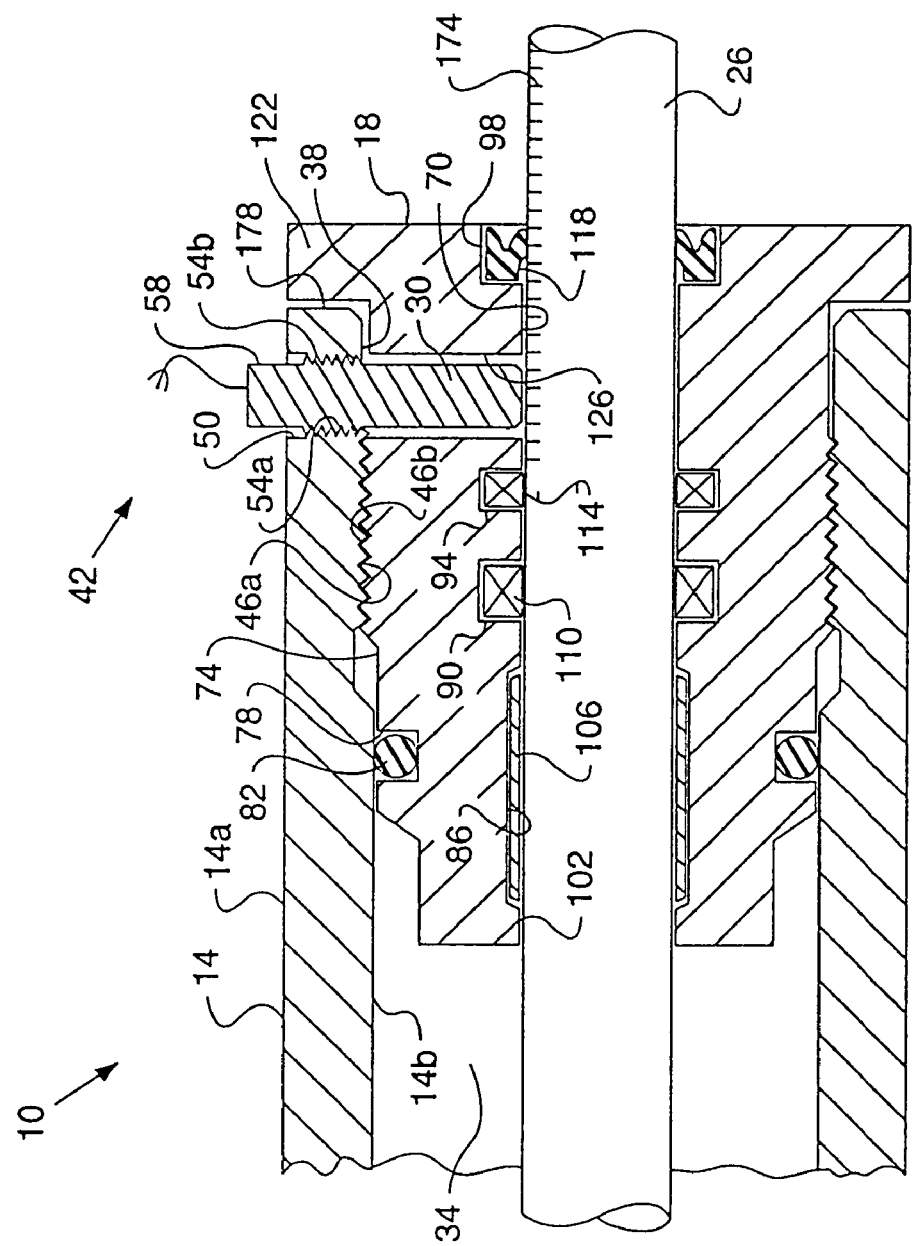
FIG. 1 is a cross-sectional view of a cylinder assembly constructed and operable according to an embodiment of the present invention.

Although the drawings depict exemplary embodiments or features of the present invention, the drawings are not necessarily to scale, and certain features may be exaggerated in order to better illustrate and explain the present invention. The exemplifications set out herein illustrate exemplary embodiments or features of the invention and such exemplifications are not to be construed as limiting the scope of the invention in any manner.

DETAILED DESCRIPTION

Reference will now be made in detail to embodiments or features of the invention, examples of which are illustrated in the accompanying drawings. Wherever possible, the same or corresponding reference numbers will be used throughout the drawings to refer to the same or corresponding parts.

Referring to FIG. 1, an exemplary embodiment of the present invention includes a cylinder assembly 10 having a cylinder body 14, a gland member 18, a rod member 26, and a position sensor 30.

The cylinder body 14 provides a longitudinally arranged cylinder chamber 34 therein for receipt of the rod member 26. A gland opening 38 is provided at one end 42 of the cylinder chamber 34 and is configured and arranged for receipt of the gland member 18. The cylinder body 14 includes a radially outer wall 14a and a radially inner wall 14b. Threads 46a may be provided on the inner wall 14b within the cylinder chamber 34 for engagement with threads 46b on the gland member 18.

A cylinder aperture 50 may be provided within the cylinder body 14 proximate the end 42 of the cylinder chamber 34. The cylinder aperture 50 of FIG. 1 is a throughbore or opening, such as a generally cylindrical throughbore, within the cylinder body 14 and intersects the cylinder chamber 34. The cylinder aperture 50 shown in FIG. 1 is generally arranged in a radial direction relative the cylinder chamber 34. It should be appreciated that the cylinder aperture 50 may be arranged in a substantially predetermined position on the cylinder body 14. An internal portion of the cylinder aperture 50 may have a threaded area 54a thereon for engaging complimentary threads 54b on a sensor body or sensor housing 58, which encloses the sensor 30. It should be appreciated that, in the absence of a sensor housing 58, complimentary threads 54b may be disposed on the sensor 30 itself.

Referring again to FIG. 1, a generally cylindrical gland member 18 may be disposed within the gland opening 38 and cylinder chamber 34 of the cylinder body 14 and may be sealingly engaged with the inner wall 14b of the cylinder body 14. The gland member 18 has a rod opening therein, such as a longitudinal throughbore 70, configured for slidable receipt of the rod member 26. A radially outer surface 74 of the gland member 18 may provide threads 46b for engaging the threads 46a of the inner wall 14b of the cylinder body 14. A seal groove 78 may also be provided along the outer surface of the gland member 18, and a seal 82 may be provided therein for ensuring a sealing engagement between the gland member 18 and the inner wall 14b of the cylinder body 14. Grooves 86, 90, 94, 98 may be provided along an internal wall 102 of the gland member 18 for seating a wear ring 106, a buffer seal 110, a rod seal 114, and a wiper seal 118, respectively. It should be appreciated that seals 114, 118 may be configured to engage the outer surface of the rod 26 to keep the area along the rod 26 between the two seals 114, 118 free from debris or other substances that may interfere with operation of the sensor 30. The gland member 18 may have a flange portion 122 disposed outside of the gland opening 38 of the cylinder body 14 and extending radially outward, for example radially beyond the inner wall 14b of the cylinder body 14.

A gland aperture 126 may be provided within the gland member 18. The gland aperture 126 of FIG. 1 forms a sensor opening within the gland member 18 for receiving the sensor 30. The gland aperture 126 is generally arranged in a radial direction relative the cylinder chamber 34 and intersects the rod opening 70 of the gland member 18. The gland aperture 126 may be arranged in substantial rotational and longitudinal alignment with the cylinder aperture 50 so that the sensor 30 may be inserted into the cylinder aperture 50 and the gland aperture 126. In the embodiment of FIG. 1, the gland aperture 126 is a generally cylindrical throughbore in the gland member 18 and has a larger cross-sectional area than the cylinder aperture 50.

The rod member 26 is slidably arranged within the rod opening 70 of the gland member 18 and is movably arranged within the cylinder chamber 34 of the cylinder body 14, where the rod member 26 may be operably connected with a piston (not shown), as is known in the art, to form a piston-and-rod assembly. One or more detectable features 174, such as barcode markings, may be disposed in a substantially predetermined rotational orientation along the length of the rod 26. It should be appreciated that the rod member 26, and therefore the detectable features 174, may be arranged in a substantially predetermined rotational orientation relative the cylinder body 14, and more specifically relative the cylinder aperture 50, so that the path of the detectable features 174 will be substantially rotationally aligned with the cylinder aperture 50. It should further be appreciated that, in one embodiment, even though the rod member 26 may be arranged in a substantially predetermined rotational orientation relative the cylinder body 14, a generally small or otherwise insignificant rotation of the rod member 26 relative the cylinder body 14 may be permissible so long as a path of the detectable features 174 remains substantially rotationally aligned with the cylinder aperture 50.

As shown in FIG. 1, the position sensor 30 is mounted to the cylinder body 14 in general alignment with the path of the one or more detectable features 174. The sensor 30 may be operable to detect the one or more detectable features 174 and responsively generate a signal indicative of the position of the rod 26 as a function of the one or more detectable features 174. In the embodiment of FIG. 1, the sensor 30 is enclosed within a sensor housing 58, is arranged within the cylinder aperture 50 and the gland aperture 126, and is therefore arranged in substantial alignment with the cylinder aperture 50 and the gland aperture 126.

Referring to FIG. 2, an alternative embodiment of the present invention includes a cylinder assembly 10' having a cylinder body 14', a gland member 18', a rod member 26, and a position sensor 30. The elements of the embodiment of FIG. 2 are generally like the elements described above with respect to FIG. 1 with the general exceptions described below.

The cylinder aperture 50' shown in FIG. 2 is configured to hold a set screw 194. For example, threads 54a' may be provided within the cylinder aperture 50' for engagement with complimentary threads 54b' formed on the outer surface of the set screw 194, which is arranged within the cylinder aperture 50' to act as a stake member with respect to the cylinder body 14' and the gland member 18'.

The gland member 18' shown in FIG. 2 includes a stake slot 182 therein. The stake slot 182 is arranged in substantial rotational and longitudinal alignment with the cylinder aperture 50' so that the set screw 194 may be inserted into the cylinder aperture 50' to engage the stake slot 182. In the embodiment of FIG. 2, the stake slot 182 is a longitudinally arranged groove on the gland member 18' and is longitudinally longer than the diameter of the cylinder aperture 50'.

A gland aperture, such as a generally cylindrical throughbore 126', may be formed within the flange portion 122' of the gland member 18' to form a sensor opening for receiving a sensor 30. The gland aperture 126' of FIG. 2 is generally arranged in a radial direction relative the cylinder chamber 34 and intersects the rod opening 70 of the gland member 18'. The gland aperture 126' may be arranged in substantial rotational alignment with the cylinder aperture 50'. It should be appreciated that the gland aperture 126' may be arranged in a substantially predetermined position on the gland member 18' with respect to the stake slot 182. An internal portion of the gland aperture 126' may have a threaded area 204a thereon for engaging complimentary threads 54b on the sensor body or sensor housing 58, which encloses the sensor 30. It should be appreciated that, in the absence of a sensor housing 58, complimentary threads 54b may be disposed on the sensor 30 itself.

A groove 98' may be provided along the internal wall 102 of the gland member 18' for seating a wiper seal 118' therein. It should be appreciated that seals 114, 118' may be configured to engage the outer surface of the rod 26 to keep the area along the rod 26 between the two seals 114, 118' free from debris or other substances that may interfere with operation of the sensor 30.

INDUSTRIAL APPLICABILITY

The present invention provides an affordable and robust sensor mount operable to accurately mount a position sensor to a hydraulic cylinder.

With specific reference to FIG. 1, the cylinder assemblies 10, 10' of FIGS. 1 and 2 may be assembled by placing the rod member 26 through the rod opening 70 of the gland member 18 so that the buffer seal 110 and rod seal 114 provide a sealing engagement between the rod member 26 and the gland member 18. The rod member 26 may be inserted into the cylinder chamber 34 of the cylinder body 14 and rotated into a substantially predetermined rotational orientation relative the cylinder body 14. The gland member 18 may be moved longitudinally into the gland opening 38 and cylinder chamber 34 of the cylinder body 14, via rotation of the gland member 18 relative the cylinder body 14 and via engagement of the threads 46a, 46b, so that the seal 82 is held in sealing engagement between the outer surface 74 of the gland member 18 and the inner wall 14b of the cylinder body 14. After the gland member 18 is sufficiently threaded within the cylinder body 14 to create a sealing engagement between the gland member 18 and the inner wall 14b of the cylinder body 14 (via the seal 82), the gland member 18 may be further rotated with respect to the cylinder body 14 until the gland aperture 126 is substantially rotationally aligned (and longitudinally aligned, in the embodiment of FIG. 1) with the cylinder aperture 50. Since the gland aperture 126 of FIG. 1 has a larger cross-sectional area than the cylinder aperture 50, the gland member 18 of FIG. 1 can be threaded into the cylinder body 14 so that the gland aperture 126 and cylinder aperture 50 may be substantially both rotationally and longitudinally aligned even if the complimentary threads 46a, 46b are not machined according to an extreme tolerance.

Referring again to the embodiment of FIG. 1, the sensor 30 and sensor housing 58 may be threaded into the cylinder aperture 50, via the threads 54a on the cylinder aperture 50 and the threads 54b on the sensor housing 58, until the sensor 30 and sensor housing 58 extend into the gland aperture 126 in sufficient proximity to the rod member 26 so that the sensor 30 may be operable to detect the one or more detectable features 174 on the rod member 26. It should be appreciated that the sensor housing 58 (or in the absence of the housing 58, then the sensor 30) of FIG. 1 acts as a stake member through engagement with the cylinder aperture 50 and the gland aperture 126 to prevent or significantly inhibit rotation of the gland member 18 relative the cylinder body 14. Thus, the gland member 18 shown in FIG. 1 is substantially rotationally and longitudinally fixed relative the cylinder body 14 via the sensor housing 58 (or the sensor 30) (and the threads 46a, 46b). It should be appreciated that since the sensor housing 58 acts as a stake member to hold the gland member 18 in position relative the cylinder body 14, the flange portion 122 of the gland member 18 need not be fully tightened against the end 178 of the cylinder body 14. This feature of the embodiment shown in FIG. 1 allows the gland member 18 to be held in its desired position relative the cylinder body 14 without relying on a tight frictional engagement between the flange portion 122 of the gland member 18 and the end 178 of the cylinder body 14, thereby reducing or eliminating a substantial reliance upon extreme accuracy in positioning/machining the threads 46a, 46b to ensure proper alignment of the gland aperture 126 with the cylinder aperture 50.

Referring more specifically now to FIG. 2, during assembly after the gland member 18' is sufficiently threaded within the cylinder body 14' to create a sealing engagement between the gland member 18' and the inner wall 14b of the cylinder body 14' (via the seal 82), the gland member 18' may be further rotated with respect to the cylinder body 14' until the stake slot 182 of the gland member 18' is substantially rotationally and longitudinally aligned with the cylinder aperture 50'. Since stake slot 182 is longitudinally longer than the cylinder aperture 50', the gland member 18' can be threaded into the cylinder body 14' so that the stake slot 182 and cylinder aperture 50' maybe substantially both rotationally and longitudinally aligned even if the complimentary threads 46a, 46b are not machined according to an extreme tolerance.

The set screw 194 may be threaded into the cylinder aperture 50', via the threads 54a' on the cylinder aperture 50' and the threads 54b' on the set screw 194, until the set screw 194 extends into and engages the stake slot 182. It should be appreciated that the set screw 194 acts as a stake member through engagement with the cylinder aperture 50' and the stake slot 182 to prevent or significantly inhibit rotation of the gland member 18' relative the cylinder body 14'. Thus, the gland member 18' shown in FIG. 2 is substantially rotationally and longitudinally fixed relative the cylinder body 14' via the set screw 194 (and the threads 46a, 46b). It should be appreciated that since the set screw 194 acts as a stake member to hold the gland member 18' in position relative the cylinder body 14', the flange portion 122' of the gland member 18' need not be fully tightened against the end 178' of the cylinder body 14'.

In the embodiment shown in FIG. 1 (and FIG. 2), the one or more detectable features 174 are arranged in a substantially predetermined orientation on the rod member 26; the rod member 26 is assembled in a substantially predetermined rotational orientation relative the cylinder body 14 (14' in FIG. 2) and the cylinder aperture 50 (50' in FIG. 2); the gland aperture 126 (or stake slot 182 in FIG. 2) is assembled in a substantially predetermined orientation relative the cylinder aperture 50 (50'); and the sensor 30 is arranged in a substantially predetermined orientation relative the gland aperture 126 (or stake slot 182) and therefore the cylinder aperture 50 (50'). As a result, the position sensor 30 will be substantially rotationally aligned with a path of the one or more detectable features 174, and the position sensor 30 may function properly by detecting the one or more detectable features 174 and responsively generating a signal indicative of the position of the rod 26 as a function of the one or more detectable features 174.

With specific reference again to FIG. 2, it should be appreciated that, during assembly when the gland member 18' of FIG. 2 is sufficiently threaded within the cylinder body 14' to create a sealing engagement between the gland member 18' and the inner wall 14b of the cylinder body 14' (via the seal 82), the gland member 18' may be further rotated, if necessary, with respect to the cylinder body 14' until the sensor 30 is substantially rotationally aligned with the path of the detectable features 174 on the rod member 26. After such alignment of the sensor 30 with the detectable features 174 of the rod member 26, the set screw 194 may be applied to the gland member 18' to substantially fix the gland member 18' relative the cylinder body 14'.

From the foregoing it will be appreciated that, although specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and disclosed examples be considered as exemplary only, with a true scope and spirit of the invention being indicated by the following claims and their equivalents. Accordingly, the invention is not limited except as by the appended claims.

What is claimed is:

1. A cylinder assembly comprising:
a cylinder body having a longitudinally arranged cylinder chamber therein, a first threaded area on the cylinder body, and a cylinder aperture in the cylinder body, the cylinder aperture intersecting the cylinder chamber;
a gland member having a rod opening therein, the gland member being disposed within the cylinder chamber of the cylinder body, the gland member having a second threaded area on the gland member, the second threaded area being threadedly engaged with the first threaded area of the cylinder body;
a rod member movably arranged within the cylinder chamber of the cylinder body and the rod opening of the gland member, the rod member having one or more detectable features disposed along the length of the rod member;
a position sensor attached to at least one of the cylinder body and the gland member and arranged in general alignment with a path of the one or more detectable features, the position sensor being operable to detect the one or more detectable features; and
a stake member arranged within the cylinder aperture and engaging the gland member, the stake member being operable to substantially rotationally fix the gland member relative the cylinder body.

2. The cylinder assembly of claim 1, wherein the stake member is at least one of the sensor and a sensor housing.

3. The cylinder assembly of claim 1, wherein the gland member includes a sensor opening, and the sensor opening is substantially rotationally and longitudinally aligned with the cylinder aperture.

4. The cylinder assembly of claim 1, wherein the gland member includes a stake slot therein, and the stake member engages the stake slot.

5. The cylinder assembly of claim 4, wherein the stake slot is a groove that is arranged in a generally longitudinal orientation on the gland member.

6. The cylinder assembly of claim 4, wherein the sensor is attached to the gland member in a substantially predetermined position relative the stake slot.

7. The cylinder assembly of claim 6, wherein:
the gland member includes a sensor opening; and
the sensor is mounted within the sensor opening.

8. The cylinder assembly of claim 7, wherein the sensor opening is a generally radially arranged throughbore in the gland member.

9. A method for detecting the position of a rod member of a cylinder assembly having (i) a cylinder body with a longitudinally arranged cylinder chamber in the cylinder body and a cylinder aperture in the cylinder body, the cylinder aperture intersecting the cylinder chamber, (ii) a gland member disposed within the cylinder chamber and including a rod opening in the gland member, and (iii) a rod member having one or more detectable features thereon, the rod member being movably arranged within the cylinder chamber of the cylinder body and the rod opening of the gland member, the method comprising:
moving the gland member within the cylinder chamber of the cylinder body;
positioning at least one of a position sensor and a sensor housing of the position sensor in an opening of the gland member;
substantially aligning the position sensor with a path of the one or more detectable features of the rod member;
substantially fixing the gland member relative the cylinder body via a stake member that is (i) disposed within the cylinder aperture of the cylinder body and (ii) arranged in engagement with the gland member;
moving the rod member within the rod opening of the gland member and the cylinder chamber of the cylinder body; and
operating the position sensor to detect the position of the rod member as a function of the one or more detectable features.

10. The method of claim 9, wherein the stake member is at least one of the position sensor and the sensor housing.

11. The method of claim 9, including positioning at least one of the position sensor and the sensor housing within the cylinder aperture.

12. The method of claim 11, including:
substantially aligning the opening in the gland member with the cylinder aperture of the cylinder body.

13. The method of claim 12, wherein the step of substantially aligning the opening in the gland member with the cylinder aperture of the cylinder body includes substantially rotationally aligning the opening in the gland member with the cylinder aperture of the cylinder body.

14. The method of claim 13, wherein the step of substantially aligning the opening in the gland member with the cylinder aperture of the cylinder body includes substantially rotationally and longitudinally aligning the opening in the gland member with the cylinder aperture of the cylinder body.

15. The method of claim 9, including:
substantially aligning the cylinder aperture of the cylinder body with a stake slot in the gland member; and
inserting the stake member into the stake slot of the gland member.

16. The method of claim 9, wherein the step of moving the gland member within the cylinder chamber of the cylinder body includes moving the gland member longitudinally with respect to the cylinder body via (i) rotation of the gland member relative the cylinder body and (ii) an engagement between threads on the gland member with threads on the cylinder body.

* * * * *